United States Patent [19]
Haupt

[11] Patent Number: 5,887,690
[45] Date of Patent: Mar. 30, 1999

[54] CLUTCH ARRANGEMENT

[75] Inventor: Josef Haupt, Tettnang, Germany

[73] Assignee: ZF Friedrichshafen AG, Friedrichshafen, Germany

[21] Appl. No.: 732,428

[22] PCT Filed: Apr. 28, 1995

[86] PCT No.: PCT/EP95/01632

§ 371 Date: Dec. 23, 1996

§ 102(e) Date: Dec. 23, 1996

[87] PCT Pub. No.: WO95/30840

PCT Pub. Date: Nov. 16, 1995

[30] Foreign Application Priority Data

May 4, 1994 [DE] Germany .......................... 44 15 664.2

[51] Int. Cl.[6] .................................................. F16D 25/10
[52] U.S. Cl. ..................................... 192/87.11; 192/87.15; 192/106 F

[58] Field of Search ............................. 192/106 F, 87.11, 192/87.14, 87.15

[56] References Cited

U.S. PATENT DOCUMENTS

| | | | |
|---|---|---|---|
| 4,732,253 | 3/1988 | Hiramatsu et al. | 192/87.11 |
| 4,759,432 | 7/1988 | Jurgens et al. | 192/106 F X |
| 4,957,195 | 9/1990 | Kano et al. | 192/106 F |
| 5,439,088 | 8/1995 | Michioka et al. | 192/106 F X |
| 5,662,198 | 9/1997 | Kojima et al. | 195/37.11 |

*Primary Examiner*—Charles A. Marmor
*Assistant Examiner*—Saul J. Rodriguez
*Attorney, Agent, or Firm*—Davis and Bujold

[57] ABSTRACT

The proposal is for a clutch arrangement consisting of at least one first clutch (4) and at least one second clutch (5). The first clutch (4) is arranged radially around the second clutch (5). Both clutches have balancing chambers (19, 20).

5 Claims, 2 Drawing Sheets

CLUTCH ARRANGEMENT

The invention concerns a clutch arrangement according to the preamble of the first claim.

A clutch in disc design consists of one first cylinder having outer discs, one second cylinder having inner discs, one piston and one resetting member such as a plate spring. In the area of the discs, both cylinders are provided with axially extending grooves so that the discs are axially movable through the piston. The torque is transmitted from the cylinder to the disc in a form-locking manner, such as by a dovetail section. The clutch engages by the piston pressing the discs against an end stop. For example, the force for adjusting the piston is produced by a pressure medium. The clutch disengages when the force of the pressure medium is eliminated. The resetting member moves the piston back to its initial position. Thereby the frictional contact of the inner and outer discs is removed. A speed-dependent distribution of the pressure medium exists by virtue of centrifugal force resulting as a disturbance variable with an additional axial force component which is superimposed in the direction of force of the piston. Said disturbance variable becomes effective in the engaging and disengaging operations of the piston or of the clutch.

A publication Funktionsbeschreibung 5 HP 30, pages 2, of ZF Getriebe GmbH Saarbrucken, March 1993, has disclosed an automatic transmission having pressure-balanced clutches. The pressure balance acts as compensation for the disturbance variable produced by centrifugal force. The disturbance variable is compensated by loading a second chamber with pressure medium. The force resulting is equal in magnitude to the disturbance variable, with an opposed and directional force so that both forces neutralize themselves. Said second chamber comprises the piston, one disc stationary in an axial direction, and the resetting member. The publication also shows a clutch arrangement having two input clutches disposed in parallel. The second cylinder of the outer input clutch is radially disposed around a third clutch. A disadvantage is that the arrangement requires a large axial length.

An advantage of the present invention is based on providing a simpler practical solution.

According to the invention the problem is solved by having a first clutch radially disposed around a second clutch where a balancing chamber of the first clutch is formed by the piston of the first clutch and the first cylinder of the second clutch. By virtue of the multiple uses served by the parts, that is, the first cylinder of the second clutch is, at the same time, the disc of the first clutch, the advantage of a smaller and more compact construction is obtained. The result is a reduction in cost because the number of parts is reduced.

In one embodiment of the invention, it is proposed that the first cylinder of the first and second clutches are driven by the same shaft. The advantage obtained hereby is that the piston of the first clutch can be sealed relative to the first cylinder of the second clutch by a simple sealing member, such as an O-ring.

In another embodiment, it is proposed that a third clutch is situated radially around a fourth clutch so that the second cylinder of the fourth clutch is connected with the first cylinder of the first clutch and that the second cylinder of the third clutch, along with the first cylinder of the fourth clutch, make up a combined part.

In another embodiment of the invention it is proposed that the balancing chamber of the first clutch and the balancing chamber of the second clutch are connected with each other. The balancing chambers of both clutches are filled via a common aperture. When the gearshift state of the clutches reciprocally changes, this arrangement offers a special advantage. Reciprocally means that the first clutch disengages and at the same time the second clutch engages or vice versa. If the first clutch engages, for example, the volume of the balancing chamber become reduced. A volume of the pressure medium contained therein is thus transported to the balancing chamber of the disengaged second clutch. The second clutch is additionally filled with pressure medium via a common aperture. A pressure level thus builds up more quickly in the balancing chamber of the second clutch. The force resulting from said pressure level has the same force direction as the resetting member. The piston is thus more quickly returned to its initial position. The clutch disengages more quickly.

In development of this it is proposed that the feed aperture, at the same time, constitutes the overflow aperture. The advantage obtained hereby is that the overflow edge of the balancing chambers is near the shaft center.

The embodiments are shown in the drawings.

Figure 1:
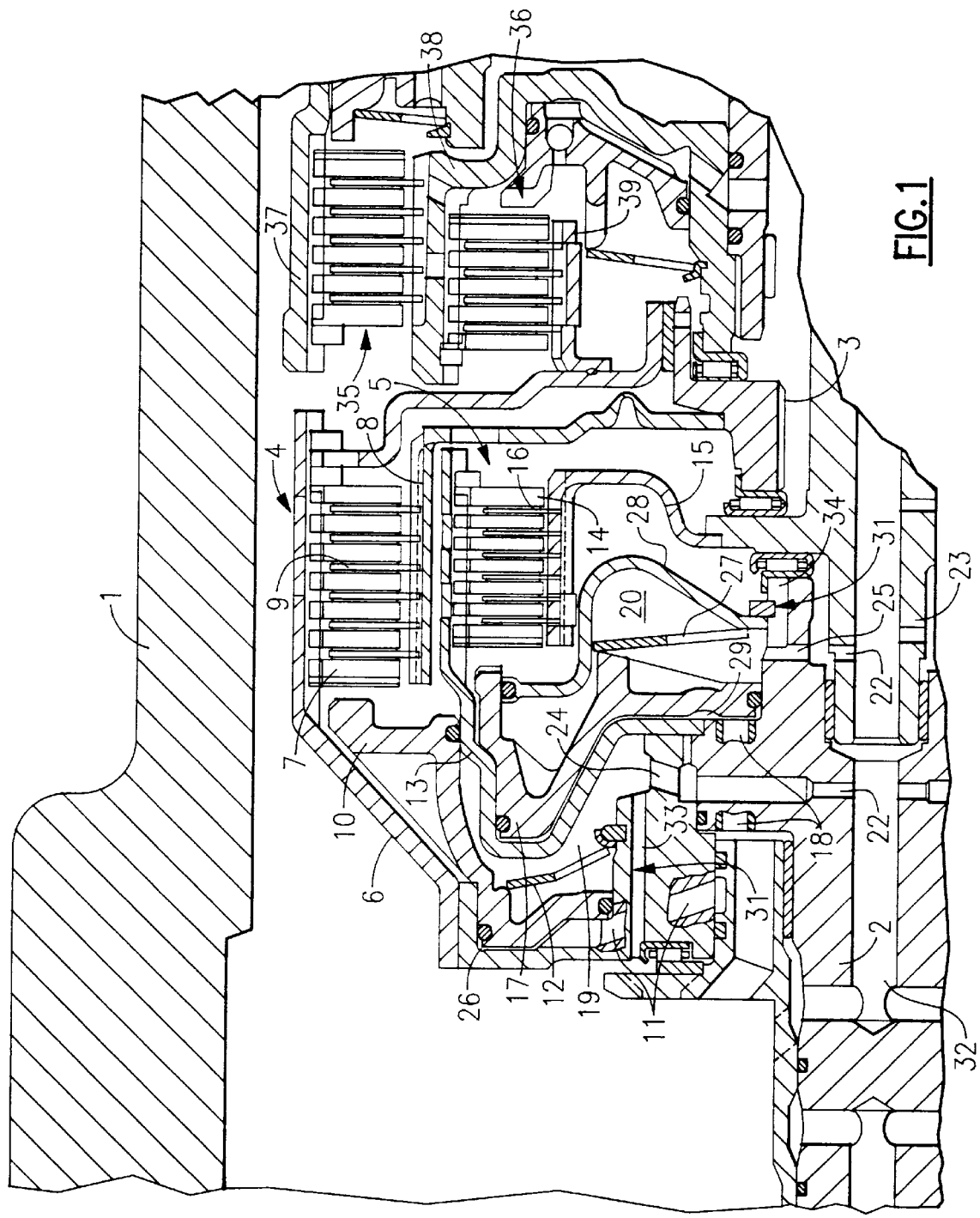
FIG. 1 is a longitudinal section of a first clutch arrangement.

In FIG. 1, a first clutch arrangement, comprised of one first clutch 4 and one second clutch 5, is shown.

The clutches 4 and 5 are supported in a transmission housing 1. The first clutch 4 is radially disposed around the second clutch 5. The first clutch 4 is composed of one first cylinder 6 with outer discs 7, one second cylinder 8 with inner discs 9, one piston 10 and one resetting member 12, shown as a plate spring. The second clutch 5 consists of one first cylinder 13 with outer discs 14, one second cylinder 15 with inner discs 16, one piston 17, one resetting member 27 and one disc 28. The disc 28 is stationary in an axial direction. In the arrangement shown, one first shaft 2 drives the first cylinders 6 and 13 of both clutches 4 and 5. The first clutch 4 is driven off of a second shaft 3, the second clutch 5 is driven off of a third shaft 23. The first clutch 4 comprises a chamber 26 and a first balancing chamber 19. The chamber 26 is formed by the piston 10 and the first cylinder 6. The first balancing chamber 19 is formed by the piston 10 and the first cylinder 13 of the second clutch 5. A chamber 29 and a second balancing chamber 20 belong to the second clutch 5. The chamber 29 is formed by the first cylinder 13 of the second clutch 5 and by the piston 17. The second balancing chamber 20 is formed by the piston 17 and the disc 28. If chamber 26 or 29 is filled with a pressure medium via respective inlets 11 and 18, it moves in an axial direction as result of the force on the piston 10 or 17, resulting in engagement of the clutch 4 or 5. The clutches 4 of 5 disengage when the chamber 26 or 29 is emptied. As a result of centrifugal force, a residual column of the pressure medium remains in the chamber 26 or 29. Said residual volume exerts an axial force upon the piston 10 or 17. Said axial force is directed opposite to the directional force of the resetting member 12 or 27, resulting in a delay in the disengagement of the first clutch 4 or second clutch 5. This disturbance variable is compensated by a corresponding pressure level appearing in the first or second balancing chamber 19 or 20. For this purpose, the pressure medium is fed to both balancing chambers via respective inlets 24 and 25. The overflow edge determines the pressure level. The balancing chambers are supplied with pressure medium via an oil-supply system 32 such as a lubricating system. The size of the feed flow is determined by the diameter of the aperture 22. If the balancing chamber 19 or 20 is filled with pressure medium, the excess pressure medium is removed via an overflow hole 33 or overflow groove 34. FIG. 1 shows an embodiment where each one of the two balancing chambers 19 and 20 has its own overflow edge 31 and its own aperture 22 for oil supply. FIG. 1 shows a third clutch 35 and a fourth clutch 36. The third clutch 35 is disposed radially around the fourth clutch 36. The second cylinder 38 of the third clutch 35 is also the first cylinder of the fourth clutch 36. The second cylinder 39 of the fourth clutch 36 is connected with the first cylinder 6 of the first clutch 4. The first cylinder 37 of the third clutch 35 leads to a shaft, not shown.

Figure 2:
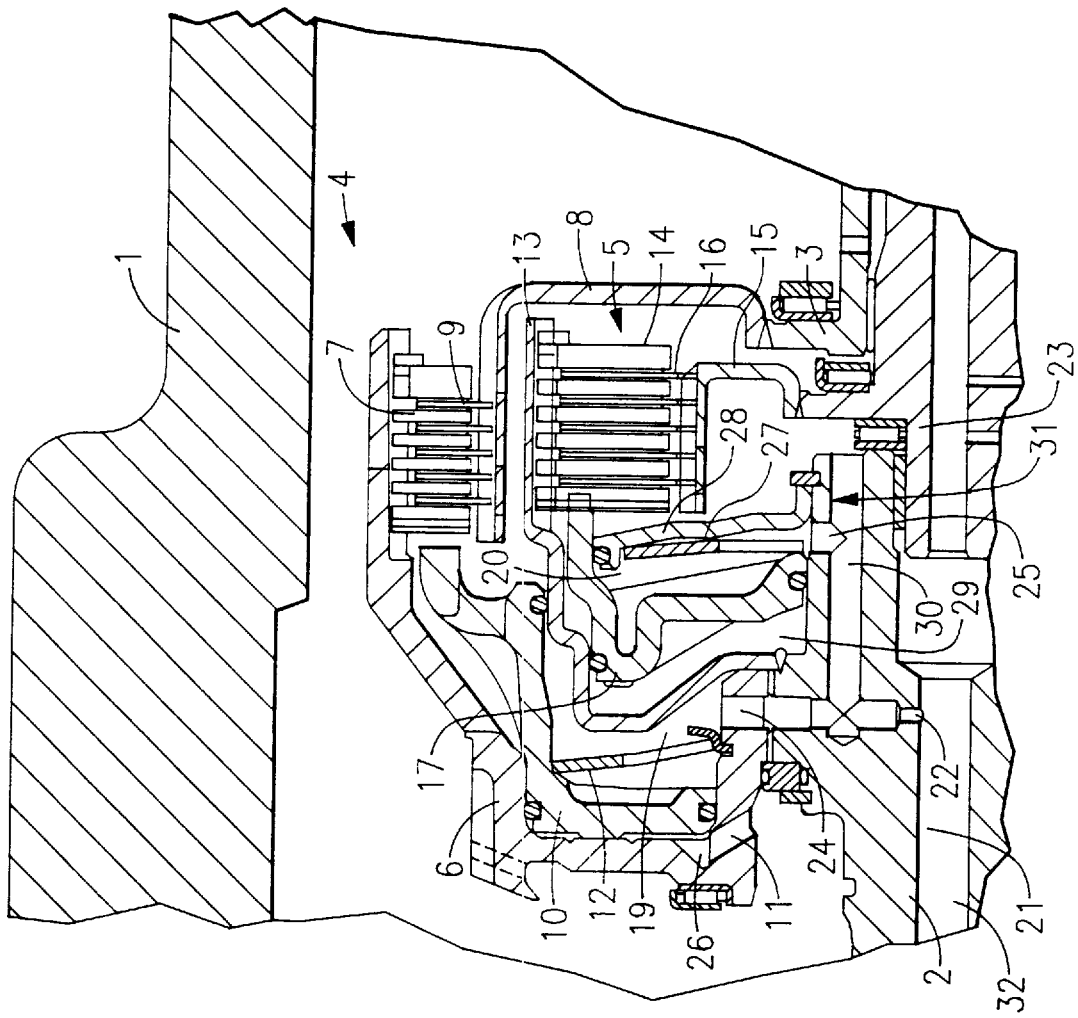
FIG. 2 is a longitudinal section of a second clutch arrangement.

FIG. 2 shows a second embodiment of the clutch arrangement. The difference from FIG. 1 is that both balancing chambers 19 and 20 are interconnected by the inlets 24, 25 and hole 30. The common overflow edge 31 is formed by the hole 30 for both balancing chambers 19 and 20. The pressure medium is fed to both balancing chambers 19 and 20 via an inlet 21 in the first shaft 2 and one aperture 22. In a reciprocal behavior of both clutches 4 and 5, the piston of the engaging clutch moves, from its balancing chamber, the column of pressure medium contained therein into the balancing chamber of the disengaging clutch. If the first clutch 4 engages, for example, the piston 10 moves the volume of pressure medium from the first balancing chamber 19 via the inlet 24, hole 30 and inlet 25 to the second balancing chamber 20 of the second clutch 5. In addition to said volume described above, is the volume from the inlet 21. Hereby a corresponding pressure level in the second balancing chamber 20 builds up more quickly so that the piston is returned more quickly to its initial position. Thereby, the time for disengaging the second clutch 5 diminishes. By this step, the blocking time shortens during repeated shifts. The volume of pressure medium fed to the balancing chambers 19 and 20 is not greater than the volume in a single supply, since the need of the balancing chambers 19 and 20 always appears periodically offset.

Reference numerals
1 transmission housing
2 first shaft
3 second shaft
4 first clutch
5 second clutch
6 first cylinder
7 outer clutch discs
8 second cylinder
9 inner clutch discs
10 piston
11 inlet
12 resetting member
13 first cylinder
14 outer clutch discs
15 second cylinder
16 inner clutch discs
17 piston
18 inlet
19 first balancing chamber
20 second balancing chamber
21 inlet
22 aperture
23 third shaft
24 inlet
25 inlet
26 chamber
27 resetting member
28 disc
29 chamber
30 hole
31 overflow edge
32 supply system
33 overflow hole
34 overflow groove
35 third clutch
36 fourth clutch
37 first cylinder
38 second cylinder
39 second cylinder

I claim:

1. A clutch arrangement having at least one first clutch and at least one second clutch (4, 5), each of the at least first and second clutches comprising:

a first cylinder (6, 13) with at least one outer clutch disc (7, 14); a second cylinder (8, 15) with at least one an inner clutch disc (9, 16); a piston (10, 17) being coupled to apply an actuation force against the at least one outer clutch disc against the at least one inner clutch disc; a resetting member (12, 27) which, in an absence of an actuation force being applied by the piston (10, 17), returns the piston (10, 17) back to an initial retracted position; and a clutch balancing chamber (19, 20);

wherein the first clutch (4) is radially disposed about the second clutch (5); the at least one second clutch has a disc (28) which together with the piston (17) forms the clutch balancing chamber (20) for the at least one second clutch (5); the piston (10) of the first clutch (4) and the first cylinder (13) of the second clutch (5) form the balancing chamber (19) for the at least one first clutch (4); and each of the balancing chambers counteracts changes in a pressure of the pistons as a result of rotation of the at least one first and the at least one second clutches (4, 5).

2. The clutch arrangement according to claim 1, wherein the first cylinder (6, 13) of both the at least one first and second clutches (4, 5) are driven by one shaft (2).

3. The clutch arrangement according to claim 1, wherein a third clutch (35) is radially disposed around a fourth clutch (36), a second cylinder (39) of the fourth clutch (36) is connected with the first cylinder (6) of the at least one first clutch (4), and a second cylinder (38) of the third clutch (35), along with a first cylinder of the fourth clutch (36), form a combined drive component.

4. The clutch arrangement according to claim 1, wherein the balancing chamber (19) of the at least one first clutch (4) and the balancing chamber (20) of the at least one second clutch (5) communicated with one another and are fillable via a common aperture (22).

5. The clutch arrangement according to claim 4, wherein an inlet (24, 25) feeds the balancing chamber (19) of the at least one first clutch (4) and the balancing chamber (20) of the at least one second clutch (5) so that excess medium is removed therefrom via one of an overflow hole (33) and an overflow groove (34).

* * * * *